Feb. 9, 1926. 1,572,175
J. H. APPLETON
MACHINE FOR MAKING LINKS OR SIMILAR ARTICLES
Filed May 17, 1924 2 Sheets-Sheet 1
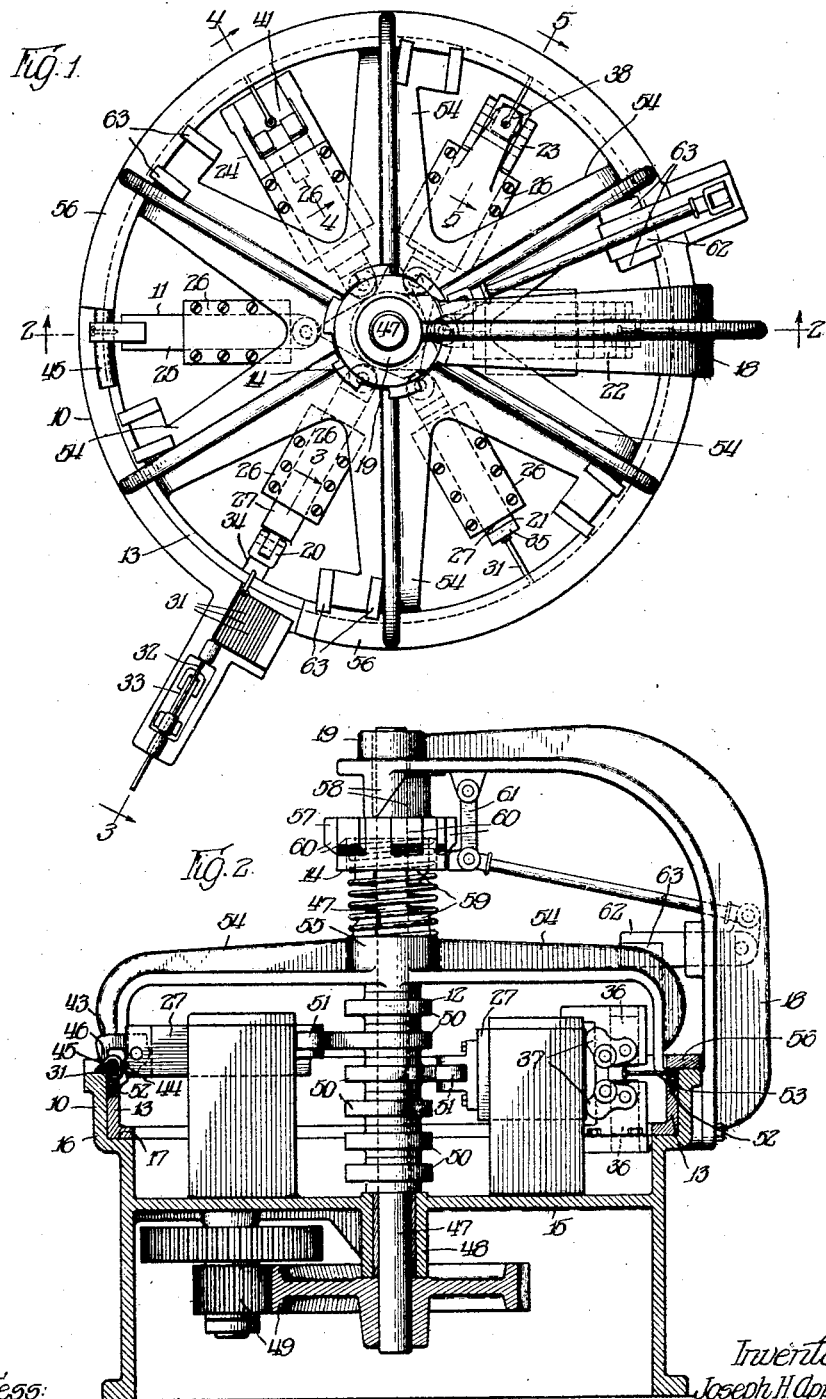
Inventor:
Joseph H Appleton Feb. 9, 1926.  
J. H. APPLETON  
1,572,175  
MACHINE FOR MAKING LINKS OR SIMILAR ARTICLES  
Filed May 17, 1924  2 Sheets-Sheet 2
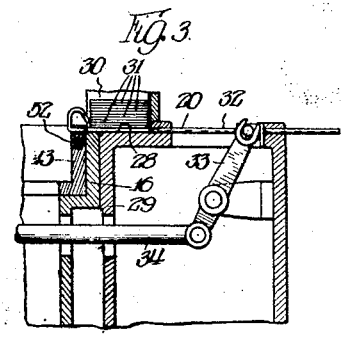

Patented Feb. 9, 1926.

1,572,175

UNITED STATES PATENT OFFICE.

JOSEPH H. APPLETON, OF PORT WASHINGTON, WISCONSIN, ASSIGNOR TO LEACH COMPANY, OF OSHKOSH, WISCONSIN, A CORPORATION OF WISCONSIN.

MACHINE FOR MAKING LINKS OR SIMILAR ARTICLES.

Application filed May 17, 1924. Serial No. 713,964.

*To all whom it may concern:*

Be it known that I, JOSEPH H. APPLETON, a citizen of the United States, residing at Port Washington, in the county of Ozaukee and State of Wisconsin, have invented certain new and useful Improvements in Machines for Making Links or Similar Articles, of which the following is a specification.

The present invention is concerned with machines for automatically making cold-shut repair links or similar articles.

One object of the invention is to provide such a machine wherein the complementary forming mechanisms are adapted to operate on stock which is already cut to length.

Another object is to provide such a machine wherein the lengths of stock to be operated on are individually supported while in course of formation.

Another object is to provide such a machine wherein the lengths of stock to be operated on are presented in operative relation to each of the complementary forming mechanisms in turn upon relative rotary movement between the mechanisms as a unit and the stock supporting means.

Another object is to provide such a machine wherein the complementary forming mechanisms are arranged compactly for efficient operation.

While the foregoing statements are indicative, in a general way, of the nature of the invention, other objects and advantages not herein specifically referred to will be appreciated upon a full comprehension of the novel features presented in the construction, arrangement and operation of the machine.

In order that the invention may be readily understood, an exemplifying embodiment of the same is set forth in the accompanying drawings and in the following detailed description based thereon. Inasmuch as the invention is obviously susceptible of embodiment in other and varied constructural forms without departure from the essence of the invention and without sacrifice of its material advantages, it will be understood that the drawing and description are to be considered as illustrative only and not as restricting the invention short of its intended scope as defined by the appended claims.

In the drawings—

Fig. 1 is a plan view of the machine;

Fig. 2 is a vertical section taken on the line 2—2 of Fig. 1;

Fig. 3 is a vertical section taken on the line 3—3 of Fig. 1;

Fig. 4 is a vertical section taken on the line 4—4 of Fig. 1;

Fig. 5 is a vertical section taken on the line 5—5 of Fig. 1;

Fig. 6 is a perspective view of one of the finished cold-shut repair links;

Fig. 7 is a vertical section illustrating a modified form of the machine wherein the feeding mechanism and the heating mechanism are combined, and corresponds generally to a section taken on the line 3—3 of Fig. 1; and Fig. 8 is a vertical section taken on the line 8—8 of Fig. 7.

It will be observed in the drawings that the machine of the invention includes a frame 10, a number of complementary forming mechanisms 11, means 12 for operating the mechanisms 11, a device 13 for supporting a number of lengths of stock in operative relation to the mechanisms 11, and means 14 for operating the device 13. The machine operates, when forming cold-shut links for instance, first to feed a length of stock into the machine, then to heat and upset one end of the length, then to flatten such upset end, then to aperture such flattened end, and then to bend the shank of the link into the finished shape shown in Fig. 6.

The frame 10 of the machine consists of a base portion 15 on which the mechanisms 11 are fixedly mounted, a rim portion 16 which is offset adjacent its upper edge to provide an annular guide 17 in which the device 13 is movably mounted, and a bracket 18 which extends upwardly from one side of the rim 16 to a point above the center of the frame where a bearing head 19 is provided.

The complementary forming mechanisms 11 consist of a feeding mechanism 20, a combined heating and upsetting mechanism 21, a flattening mechanism 22, a punching mechanism 23, a primary bending mechanism 24, and a secondary bending mechanism 25. Each of the forming mechanisms 11 includes a guide bracket 26 which is fixedly mounted on the base portion 15 of the frame and an associated cam follower 27 which is slidably mounted in the bracket 26 for reciprocal movement radially of the frame.

The feeding mechanism 20 (Fig. 3) comprises a substantially horizontal slot 28 which is positioned radially of the frame in the rim portion 16 and in a laterally extended portion 29 of the frame, a chute 30 above the slot 28 for holding in superposed relation a number of lengths 31 of stock to be fed to the device 13 of the machine, a plunger 32 which is reciprocally mounted in the slot 28 for ejecting the lowermost length of stock in the chute from the slot 28 and into engagement with the device 13, and a link 33 which is connected by a rod 34 to the cam follower 27 of the feeding mechanism for reciprocating the plunger 32 upon actuation of the cam follower 27.

The combined heating and upsetting mechanism 21 (Fig. 1) comprises an electrode head 35 which is mounted on the free end of the cam follower 27. The length of stock supported by the device 13 in operative relation to the combined heating and upsetting mechanism is heated by the passage therethrough of an electric current in a circuit which has as its terminals the electrode head 35 and that portion of the device 13 contacting with the length of stock, and, when the length of stock has been sufficiently heated, the electrode head 35 is driven outwardly by the cam follower 27 to upset one end of the length of stock.

The flattening mechanism 22 (Fig. 2) comprises two vertically aligned and oppositely moving hammers 36 which are adapted to be brought together upon that end of the length of stock upset by the heating and upsetting mechanism 21, and two pivotally mounted camming levers 37 which are interposed between the cam follower 27 and the hammers 36 for translating the horizontal movement of the former into the vertical movement of the latter.

The punching mechanism 23 (Fig. 5) comprises an inverted die head 38 against which the upper flattened face of the length of stock 31 is adapted to be positioned in centered relation to a vertical punch bore in the die head, a vertically reciprocable punch 39 mounted in an extension of the bracket 26 in axial alignment with the punch bore, and a pivotally mounted camming lever 40 for translating the horizontal movement of the cam follower 27 into the vertical movement of the punch 39.

The primary bending mechanism 24 (Fig. 4) comprises a pivotally mounted die member 41 which has its intermediate bending portion in engagement with the previously straight length of stock and its free end portion in engagement with the cam follower 27. When the cam follower 27 is reciprocated, the die member 41 is oscillated and bends the major portion of the length of stock into a vertical position as indicated in dotted lines at 42.

The secondary bending mechanism 25 (Fig. 2) includes a hook-shaped die member 43 which is mounted for limited pivotal movement on the cam follower 27. When the cam follower 27 is reciprocated outwardly, the lower portion 44 of the die member 43 contacts with the lower portion of the length of stock which is fixedly supported at its opposite side by a triangularly shaped anvil 45 mounted on the rim 16 of the frame, and causes the upper portion 46 of the die member 43 to move outwardly and downwardly to bend the length of stock into the form of the finished link.

The means 12 for operating all of the forming mechanisms heretofore described consists of a vertical shaft 47 which is journaled centrally of the frame 10 with its lower end in a bearing 48 in the base portion 15 of the frame and its upper end in the bearing head 19 of the bracket 18 of the frame. The shaft 47 is rotated from a suitable source of power through gears 49, and is provided, above the base portion 15, with a plurality of cams 50 which are in operative engagement with cam rollers 51 mounted on the inner ends of the cam followers 27. During each revolution of the shaft 47, the cams 50 cause all of the forming mechanisms to function by reciprocating the cam followers 27 of the same. Any suitable means, such as springs or the like, are provided to return the cam followers 27 to their innermost positions.

The device 13 for supporting the lengths of stock in operative relation to the several forming mechanisms in turn, is an annular member which is journaled in the guide 17 of the frame and is provided, adjacent its upper rim, with radially disposed bores 52 corresponding in number to the number of forming mechanisms embodied in the machine. The device 13 is moved in its operation to positions wherein the bores 52 successively come into alignment with the slot 28 of the feeding mechanism, and the lengths of stock are inserted in the bores by the plunger 32 to radial positions wherein the outside ends of the lengths of stock are flush with the outside face of the annular member 13. Small upwardly spring-pressed plungers 53, or any other means suitable for the purpose, may be employed to prevent the lengths of stock from accidentally turning in the bores 52 during the several forming operations, the lengths of stock being prevented from moving outwardly again, after being moved by the device 13 out of alignment with the feeding mechanism, by the inner contacting face of the rim 16 of the frame, as shown in Figs. 2, 4 and 5. During each revolution of the shaft 47, but at a time when all of the forming mechanisms are temporarily inactive, the device 13 rotates a portion of a turn to bring each length of stock supported thereby from its position in operative relation to one mechanism 11 into its position in operative relation to the next mechanism 11.

The device 13 is provided, at points between the bores 52, with a plurality of upwardly and inwardly extending spokes 54 which terminate, centrally of the machine, in a hub 55 which is sleeved upon the shaft 47. An annular shoulder 56 is provided on the upper edge of the rim 16 of the frame, and projects inwardly over the upper edge of the device 13 throughout the greater portion of its circumference, terminating adjacent the secondary bending mechanism 25 in the short triangular anvil 45 previously described, and commencing again on the other side of the feeding mechanism 20, as shown in Fig. 1. The shoulder 56 serves to maintain the annular member 13 seated in the guide 17 of the frame, and to provide the anvil 45 about which the secondary bending operation on the link is performed; and the interruption in the shoulder adjacent the feeding mechanism serves to permit the finished bent link to be ejected from that bore 52 in alignment with the feeding mechanism by the incoming length of stock.

The means 14 for turning the device 13 a portion of a revolution during each revolution of the shaft 47 consists of an upwardly spring-pressed clutch collar 57 which is splined on the shaft 47 for vertical movement between the bearing head 19 of the bracket 18 and the hub 55 of the device 13. The opposing faces of the bearing head 19 and the collar 57 are each provided with a short cam 58, and the opposing faces of the collar 57 and the hub 55 are each provided with a jaw clutch 59. When the shaft 47 and the clutch collar 57 are rotating, the cams 58 engage with each other during approximately a one-sixth part of each revolution, and the collar 57 is thereupon shifted downwardly into clutched engagement with the hub 55, causing the device 13 to be moved a one-sixth part of each revolution or an amount wherein the lengths of stock supported thereby are caused to move the distance separating any two of the mechanisms. The outer face of the clutch collar 57 is provided with a plurality of corresponding cams 60 which operate a cam follower 61 when the collar is clutched with the hub 55 to release an indexing latch 62 which engages in slots provided about the superstructure of the device 13 by pairs of spaced lugs 63. The recesses on the clutch collar 57 between the cams 60 permit the cam follower 61 to return to its normal position as soon as the collar has turned the hub the proper distance, and the position of the device 13 is as a consequence accurately indexed by the action of the latch 62 in abruptly stopping the movement of the device 13.

The operation of the machine of the invention, while evident from the foregoing detailed description, may be briefly summarized as follows:

The operating shaft 47 rotates continuously, and during each revolution serves, first, to move the lengths of stock supported in the device 13 from positions in operative relation to certain of the mechanisms to new positions in operative relation to the next succeeding mechanisms and, then, to cause all of the forming mechanisms to operate upon the lengths of stock presented in operative relation thereto by the device 13. As each one of the stock-supporting bores 52 of the device 13 is brought into alignment with the feeding mechanism 20, a new length of stock is fed thereinto and the finished length previously occupying such bore is expelled by the new length of stock and permitted to drop into any suitable receptacle adjacent the base of the machine.

In Figs. 7 and 8 is shown a modified form of the invention wherein the feeding mechanism 20 and the heating portion of the combined heating and upsetting mechanism 21 of the first embodiment are replaced by a combined heating and feeding mechanism 64. The mechanism 64 consists of a furnace 65 which is interiorly provided with an inclined chute 66 upon which the lengths of stock to be fed to the machine are adapted to rest. That side of the chute 66 adjacent the machine is cut away at its bottom to permit the heated gases of the furnace to come in contact with the ends of the lowermost lengths of stock. The bottom of the chute 66 terminates in a slot 67 in which the ejecting plunger 32 operates in the manner described in connection with the first embodiment. This form of the invention permits of a substantial increase in the speed of production, since in the first form the speed of the machine must be relatively slow in order to permit the length of stock at the combined heating and upsetting mechanism to heat sufficiently, while in this form no delay need be occasioned between operations because of the time required in the heating operation.

I claim:

1. In a machine for making links or similar articles, a generally circular frame, a number of complementary forming mechanisms fixedly mounted in a circle on the frame, an operating shaft journaled in the frame at the center of the mechanisms, cam connections between the shaft and the mechanisms for operating all of the latter once during each revolution of the shaft, a generally annular device rotatably mounted on the frame for supporting a number of lengths of stock in operative relation to the mechanisms, and a clutch connection between the shaft and the device for intermittently rotating the latter a part of one revolution corresponding to the distance between any two mechanisms during each revolution of the shaft and while all of the mechanisms are inactive to present each of the lengths of stock in operative relation to each of the mechanisms in turn.

2. In a machine for making links or similar articles, a generally circular frame, a number of complementary forming mechanisms fixedly mounted in a circle on the frame, an operating shaft journaled in the frame at the center of the mechanisms, cam connections between the shaft and the mechanisms for operating all of the latter once during each revolution of the shaft, a generally annular device rotatably mounted on the frame for supporting a number of lengths of stock in operative relation to the mechanisms, a clutch connection between the shaft and the device for intermittently rotating the latter, and means operative upon the completion of each intermittent movement of the device to lock the same with the stock supporting portions thereof in proper register with the mechanisms.

3. In a machine for making links or similar articles, a generally circular frame, a number of complementary forming mechanisms fixedly positioned in a circle on the frame, a cam shaft journaled in the frame at the center of the mechanisms, and a number of cam followers reciprocally mounted on the frame radially of the same for operating the mechanisms from the shaft upon each revolution of the same.

4. In a machine for making links or similar articles, a mechanism for first heating and then upsetting a portion of a length of stock, including a movable hammer having its impact face electrically connected to constitute an electrode for heating a length of stock while in contact therewith and prior to upsetting the same, and means for automatically moving the hammer to upset the length of stock upon completion of the heating operation.

5. In a machine for making links or similar articles, a mechanism for first heating and then upsetting a portion of a length of stock, including a continuously rotating cam, a reciprocating cam follower for operating the mechanism, and a hammer carried by the cam follower and having its impact face electrically connected to constitute an electrode for heating a length of stock while in contact therewith and prior to upsetting the same, said cam advancing the cam follower to upset the stock with the hammer upon completion of the heating operation.

6. In a machine for making links or similar articles, a mechanism for flattening an upset portion of a length of stock, including two opposing hammers mounted for movement toward and away from each other, a reciprocating member for operating the mechanism movable perpendicularly to the hammers, and camming levers connecting the operating member with the hammers for translating the movement of the former into the movement of the latter.

7. In a machine for making links or similar articles, a mechanism for aperturing an upset and flattened portion of a length of stock, including a stationary apertured die head, a punch movable toward and away from the die head in alignment with the aperture therein, a reciprocating member for operating the mechanism movable perpendicularly to the movement of the punch, and a camming lever connecting the operating member with the punch for translating the movement of the former into the movement of the latter.

8. In a machine for making links or similar articles, a mechanism for bending a straight length of stock approximately 90°, including a pivotally mounted die member having a face for engagement with the stock normally positioned at an angle to the axis of the stock, and a reciprocating member for operating the die member movable parallel to the axis of the stock while in engagement with the interposed die member.

9. In a machine for making links or similar articles, a mechanism for bending a length of stock more than 90°, including a stationary anvil about which the stock is to be bent and against one face of which a portion of the stock is adapted to be held, an operating member movable toward and away from the anvil perpendicularly to the axis of the stock held thereagainst, and a hook-shaped die member mounted for limited pivotal movement on the end of the operating member and adapted to tilt on the operating member upon engagement with that portion of the stock backed by the anvil whereby to bend the unbacked portion about the anvil upon further movement of the operating member.

10. In a machine for making links or similar articles, a number of complementary forming mechanisms, means for operating the mechanisms, a radially apertured annular member for supporting in the apertures thereof a number of lengths of stock in operative relation to the mechanisms, and means for effecting relative movement between the stock supporting member and the mechanisms to present each of the lengths of stock in operative relation to each of the mechanisms in turn.

11. In a machine for making links or similar articles, a number of complementary forming mechanisms, a device for supporting a length of stock in operative relation to any one of the mechanisms, and a single continuously rotating shaft having separate power transmitting connections with the forming mechanisms and with the supporting device for both intermittently operating the mechanisms and intermittnetly effecting relative movement between the device and the mechanisms while the latter are not operating to present the length of stock in operative relation to each of the mechanisms in turn.

12. In a machine for making links or similar articles, a number of complementary forming mechanisms operative upon a length of stock to aperture one portion and bend another portion of the same, means for operating the mechanisms, a device engageable with still another portion of the stock throughout the operation of the machine for supporting the stock in operative relation to any one of the mechanisms, and means for effecting relative movement between the device and the mechanisms to present the length of stock in operative relation to each of the mechanisms in turn.

13. In a machine for making links or similar articles, a number of complementary forming mechanisms, means for operating the mechanisms, a device for supporting a length of stock in operative relation to any one of the mechanisms, means for intermittently effecting relative movement between the device and the mechanisms to present the length of stock in operative relation to each of the mechanisms in turn, and means operative upon the completion of each intermittent movement to lock the device and the mechanisms with the stock supporting portion of the device in proper register with the mechanisms.

14. In a machine for making links or similar articles, a generally circular frame, a number of complementary forming mechanisms arranged on the frame, a radially apertured annular member rotatably mounted on the frame for supporting in the apertures thereof a number of lengths of stock in operative relation to the mechanisms, means for holding the stock against accidental displacement when in the apertures, and means for intermittently rotating the stock supporting member to move the stock carried thereby from one mechanism to another.

In testimony whereof I have hereunto subscribed my name.

JOSEPH H. APPLETON.